United States Patent
de la Torre Barreiro

[11] Patent Number: 5,468,378
[45] Date of Patent: Nov. 21, 1995

[54] MAGNETIC CONDITIONERS FOR TREATING LIQUIDS

[76] Inventor: Jose L. de la Torre Barreiro, Rafael Calvo No. 30, 28010 Madrid, Spain

[21] Appl. No.: 143,414

[22] Filed: Oct. 25, 1993

[30] Foreign Application Priority Data

Feb. 4, 1993 [ES] Spain .................................. 9300201

[51] Int. Cl.$^6$ ........................................... C02F 1/48
[52] U.S. Cl. .......................... 210/192; 210/222; 210/223; 210/243
[58] Field of Search ..................... 210/222, 223, 210/243, 192

[56] References Cited

U.S. PATENT DOCUMENTS 4,422,933  12/1983  Sverre et al. ............................. 210/222

FOREIGN PATENT DOCUMENTS 29014    2/1984   Japan ..................................... 210/222
1520017  11/1989  U.S.S.R. ................................. 210/222
1682714  10/1991  U.S.S.R. ................................. 210/223

*Primary Examiner*—Matthew O. Savage
*Attorney, Agent, or Firm*—Robbins, Berliner & Carson

[57] ABSTRACT

These improvements are applicable to conditioners fitted with three independent magnetic fields, each generated by a magnet or set of magnets (3, 5, 7) and consisting in coupling to the first magnet or set of magnets (3) an auxiliary magnet or group of magnets (17) using a telescoping shaft (16), which complementary magnet (17) will tend to move away from the first magnetic field (3) and will carry a front or conical plug (18) which may move to a greater or lesser extent depending on the stream of fluid running through the conditioner, such that the greater the stream of water, the closer this auxiliary magnet (17) is and the greater the intensity of the magnetic field in the area (20) where the water flows through between the permanent magnet or magnet group (3) and its magnetically permeable body (4). The design also provides for the incorporation of a magnetic filter (12–13) and a rotor fitted with blades (21–22), equipped with a coil (23) in which an electromotive force is generated which may be tapped through outside contacts (24).

6 Claims, 2 Drawing Sheets

MAGNETIC CONDITIONERS FOR TREATING LIQUIDS

PURPOSE OF THE INVENTION

This invention is a series of improvements introduced into magnetic conditioners for treating liquids such as, for example, drinking water, water for heat exchanges, fuels, etcetera.

Depending on the specific application for which a given magnetic conditioner is designed, with the improvements concerned herein, the conditioner will prevent the formation of crust and scales on the inner wall of the pipes through which the liquid circulates, ionize water for human consumption, intensify the combustion process, etcetera.

FORERUNNERS OF THE INVENTION

Magnetic water treatment is a non-chemical method consisting in running the water through a magnetic field having a strength of 1,000 to 10,000 gauss.

The magnetic field is generated by a bank of permanent magnets forming a coaxial magnetic circuit. Under normal conditions, the magnetic field strength is preserved indefinitely (loss of 0.15% of its magnetism every thirty years). The magnetic unit requires no special maintenance, except for inspection and cleaning for the magnetic filter set alongside the bank of magnets, which prevents any clogging due to metal particles suspended in the body of water.

Among the known patents based on this treatment are Spanish patents of invention 490,239, 496,327, 508,581 and 553,149, as well as models of utility 285,515 and 286,311, wherein different solutions are described with regard to the means used to create the coaxial magnetic circuit that is to act on the water.

However, the same constant appears in all these solutions: each descaler has an optimal operating range which depends on its diameter.

This is because water lines never flow in a constant stream, since the rate at which liquid circulates through conditioners varies depending on users' needs. In conventional apparatuses, a constant rate of water flow of between 1 and 3 m/sec. must be maintained in order for these apparatuses to perform their conditioning task well.

In an attempt to overcome this problem, this applicant holds patent of invention 8903003, describing a magnetic conditioner for treating liquids which, based on the incorporation of several magnetic fields totally independent of one another, with different operating angles and circulating liquid flowthrough areas, allows for an optimal fit in all cases of real practice.

More specifically, said conditioner was designed to have three separate magnetic fields, the first formed by permanent working ring magnets and magnetically permeable body which succeed in concentrating the entire magnetic field in the circulating liquid flowthrough areas, forming a radial magnetic field at a perpendicular angle to the liquid flow, with the possibility of regulating the stream to meet the needs of the case at hand. Next, after a spacer ring made of magnetic material, lies the second field, formed by a permanent magnet or a series of groups of permanent working magnets placed so that the resulting field does not interfere with the field of the adjacent magnets. This magnet or set of magnets is centered along the interior of a tube made of ferromagnetic material, at a preset radial distance. This assembly forms a radial magnetic field at an altered angle. Next, after another spacer, there is a third magnetic field whose characteristics match those of the first.

DESCRIPTION OF THE INVENTION

The improvements proposed herein, applicable to a magnetic conditioner for treating liquids such as the one in Spanish patent 8903003, published Jul. 16, 1990, not only considerably simplify the structure of said conditioner, but also considerably strengthen its powers.

More specifically, in accordance with one of the improvements herein, at the intake to the housing of the conditioner, before the magnet or magnetic group, there is an oblique side outlet, closed by a suitable cap, to which is attached a magnet and a stainless steel strainer or sieve reaching all the way to the main conduit, such that this assembly prevents particles of a certain size from obstructing or interfering with the conditioner's magnetic fields at the same time as it attracts metal particles swept along by the fluid toward the cap area.

Another improvement included in the invention affects the flow regulating system in the core of the conditioner itself, so that it is automatically regulated. To do so, a complementary magnet or group of magnets is coupled frontally and axially, with the aid of a telescoping shaft, to the axial alignment of magnets comprising the conditioner's main operational nucleus. Attached to said magnet or group of magnets is a conical plug, such that the repelling force between this complementary magnet or group of magnets and the main magnet or group of magnets tends to push the plug toward a seat in the housing, also in the shape of a truncated cone, interrupting water circulation. Obviously, the extraction of this plug will depend on the water stream passing through the conditioner, maintaining said stream and the liquid flowthrough area allowed by the aforesaid plug proportional, and at the same time producing an increase in the magnetic field in the magnetically permeable bodies when the fluid stream increases.

Lastly, in accordance with another of the improvements herein advanced, the magnetic conditioner has been designed to be able to act simultaneously as a current generator, by implanting in its core a coil mounted on a bladed rotor, such that said coil is turned by the circulation of the fluid, generating in the coil core an electromotive force which may be tapped for any use through suitably-placed contacts on the outside surface of the housing.

DESCRIPTION OF DRAWINGS

In order to complement the description made herein and to aid in better understanding the characteristics of the invention, attached to this descriptive report as an integral part hereof is a set of drawings designed to illustrate but not to limit the following.

PREFERRED EXECUTION OF THE INVENTION

Figure 1:
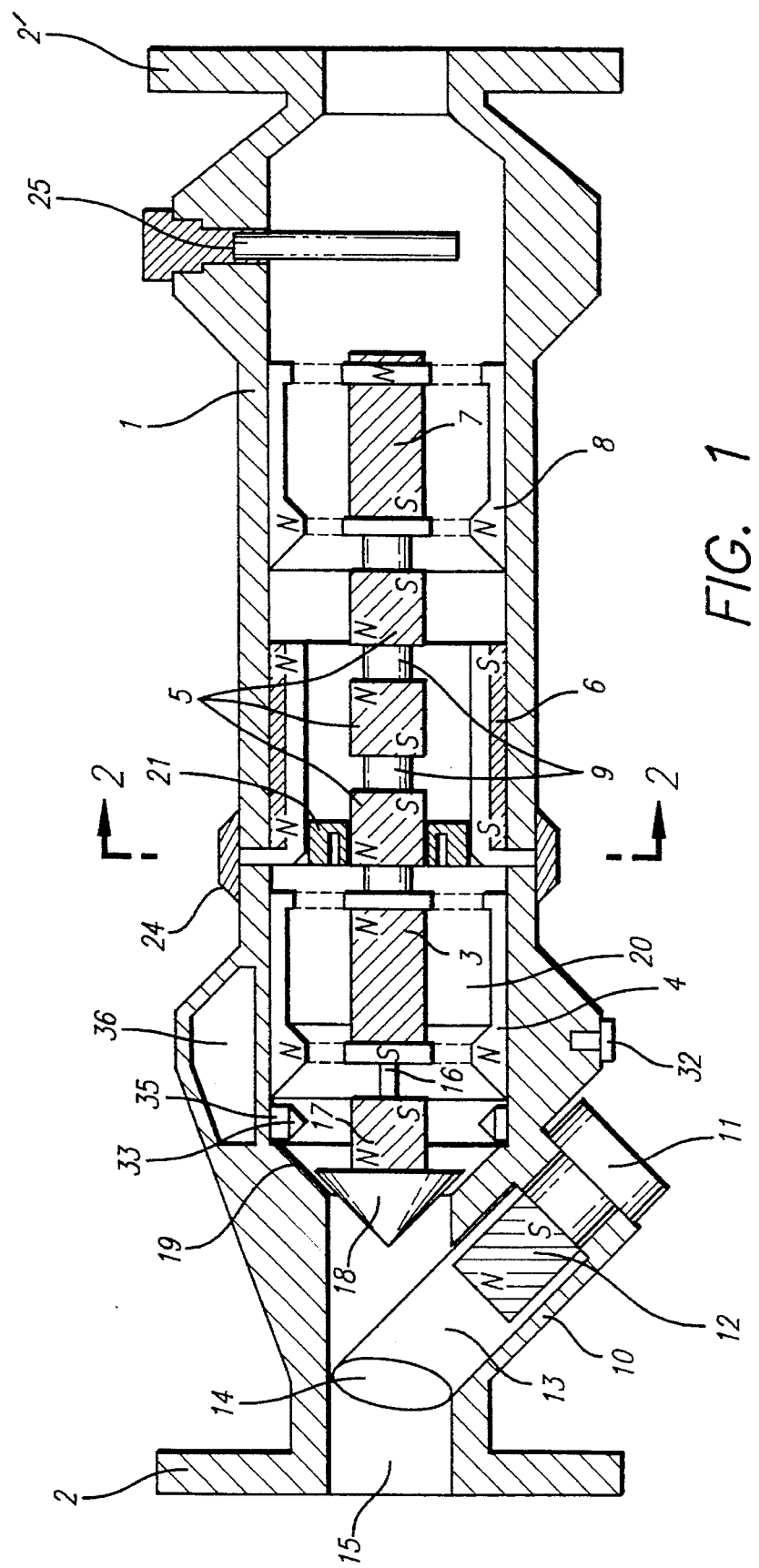
FIG. 1. This figure shows a side elevational view in a lengthwise cross section of a magnetic conditioner for treating liquids built in accordance with the improvements concerned herein.

In view of these figures, especially FIG. 1, it may be seen how a magnetic generator constructed in accordance with the improvements proposed herein is built with a body or housing (1) terminating in end flanges (2–2') equipped for intercalating the conditioner into the conduit carrying the liquids or fluids to be treated. In the core of this body (1) is established, as in patent of invention 8903003, a first permanent magnet or group of permanent magnets (3) with their corresponding sheathing annular magnetically permeable body (4); a second permanent magnet or group of permanent magnets (5), also with its corresponding magnetically permeable body (6); and a third permanent magnet or group of permanent magnets (7) with their magnetically permeable body (8); all these permanent magnets or groups of permanent magnets are coupled to one another coaxially and are appropriately distributed with the aid of suitable spacers (9).

Starting from this basic structure, in accordance with one of the improvements herein, near the intake flange (2), the body (1) incorporates a side duct or outlet (10), in the oblique position shown in figure 1, closed by means of a workable lid (11) to which are suitably fixed a permanent magnet (12) and a strainer or sieve (13), preferably made of stainless steel, whose free end (14) is positioned diametrically in the core of the main conduit (15) of the conditioner, forming a perforated barrier to the passage of the fluid which collects all kinds of solids larger than a preset size, especially metallic solids attracted by the permanent magnet (12), keeping such metal particles from interfering with or short-circuiting the magnetic circuits of the conditioner.

In accordance with another of the improvements herein, the first magnet or group of magnets (3) is coupled coaxially with the help of the telescoping shaft (16) to an auxiliary magnet or group of magnets (17), ending in a conical plug (18) which tends, due to the polarity of the magnet itself (17), to move into its closed or plugged position in a seat (19) in the shape of a truncated cone formed by the body or housing (1) itself. In accordance with this construction, clearly, the greater the stream of water passing through the conditioner, the greater the movement of the conical plug (18), the closer the complementary magnet (17) is brought to the first magnet or magnet group (3) and, therefore, the greater the intensity of the magnetic field in the operating area (20) of the conditioner defined by the magnetically permeable body (4).

Figure 2:
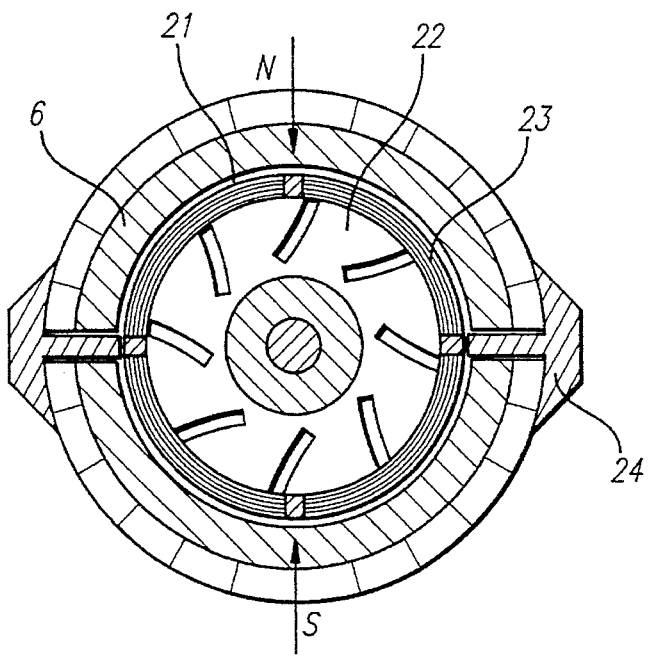
FIG. 2. This figure shows a cross section of the generator shown in FIG. 1, cut along the A–B line on said figure.

In accordance with another of the improvements herein, the conditioner may act simultaneously as a current generator, for which purpose at the level of, the middle magnet or magnet group (5) there is a rotor (21) fitted with a number of inner blades (22). This rotor is linked to a coil (23) such that when the fluid circulates through the inside of the conditioner, the proper orientation of the blades (22) causes the rotor (21) and coil (23) to turn. As shown in FIG. 2, the magnetically permeable body (6) surrounds to coil (23) and includes a first magnet portion having a north pole facing the longitudinal axis of the body and a second magnet portion located opposite the first magnet portion having a south pole facing the longitudinal axis. This, due to the effect of the magnetic field of the magnets (6) sheathing the coil, generates in the coil (23) an electromotive force which may be tapped for any use through contacts (24) suitably placed on the outer skin of the body (1). The generator thus obtained may be properly grounded.

In accordance with the structure described herein, a magnetic conditioner with the improvements concerned herein is applicable in the water treatment industry. Said conditioner can successfully filter out all suspended solids circulating through the water supply lines, in addition to preventing lime scales in pipes and eliminating already existing scales. With the classic sacrificial anode (25), the facility is protected from galvanic corrosion.

Complementarily, the water circulating through the apparatus provides a certain amount of electrical energy directly proportional to the stream of water circulating through the conditioner. This power may be tapped for lighting, to power an electronic circuit monitoring the water stream circulating through the apparatus, etcetera. This electricity may be consumed directly or stored in suitable storage batteries.

In domestic applications, because the average stream is smaller, the sacrificial anode may be done away with, and for economic reasons a current generator is not of interest.

The conditioner may also be applied in the magnetic treatment of fuels, where the combustion process is intensified, allowing more oxygen ions to combine with carbon monoxide molecules to form carbon dioxide ($CO_2$). Since this type of combustion is fuller, such treatment reduces emissions of hydrocarbons, cleans the combustion chambers, cleans spark plugs and other engine components, and saves on fuel consumption since it boosts the performance of the treated fuel. In this case, as in the preceding case, the sacrificial anode is also unnecessary, and the electrical generator is eliminated for economic reasons.

Figure 3:
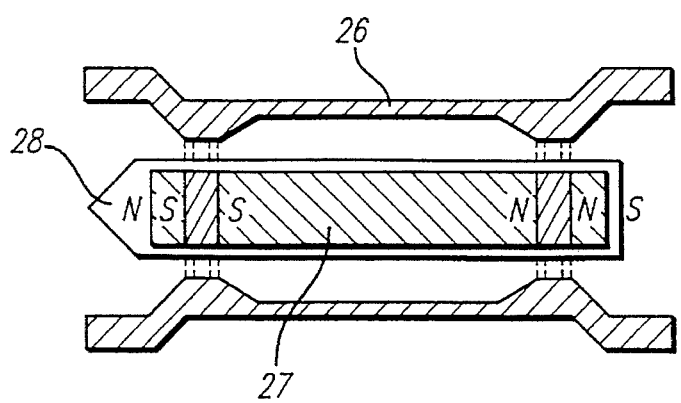
FIG. 3. This figure shows a diagram similar to FIG. 1, but depicting a conditioner designed for therapeutic use.
Figure 4:
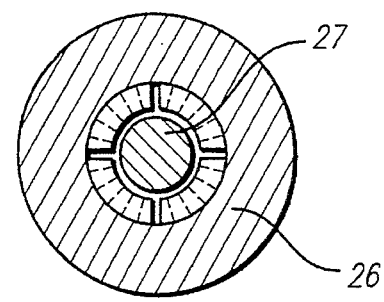
FIG. 4. This figure shows a cross section of the generator shown in FIG. 3.

This simplified conditioner is the one shown in FIGS. 3 and 4, where the conditioner's housing has not been depicted, or where a housing (26) made of magnetic material may be used as a substitute, therefore acting as a magnetically permeable body, and where all magnets or all magnet in the working group mentioned above are linked in the core of a housing (27) made of nonmagnetic material, whose front end constitutes the aforesaid conical plug (28). This solution is especially appropriate in therapeutic uses, since, as is well known, water ionized by a magnetic field keeps all the salts the human body needs intact, since its chemical composition is not altered, and it also acquires a greater solvent capacity, becoming more diuretic and digestive and thus beneficial for the body.

Returning again to the electrical generator feature of the conditioner, said generator is especially indicated for producing direct current. As shown in the diagram in FIG. 5, where the whole generator, as the whole described above, appears labeled (29), said generator is coupled to a voltage multiplier (30), which is coupled to a frequency converter (31), one of whose terminals (32) is grounded to the tubular body (1) while the other is connected to a distributing ring (33) in which a direct current of on the order of 6,000 volts and a very high frequency is obtained. This current in turn creates an electrical field (34) without a current, flow. This field is entirely innocuous for humans due to its very low intensity (on the order of 3 to 10 milliamperes). Obviously, this field is created in the core of the aforesaid distributing ring (33), mounted on the body (1) of the conditioner with a teflon sleeve (35), and it causes the oxygen in the water to change into ozone, which, as is well-known, is a highly effective bactericide (on the order of 600 times more powerful than chlorine) and in addition has no byproducts that may pose a hazard in the long run.

The electrostatic field thus produced controls the growth of bacteria, and said control may also be observed to extend to the initial growth of viruses, parasites and algae.

Figure 5:
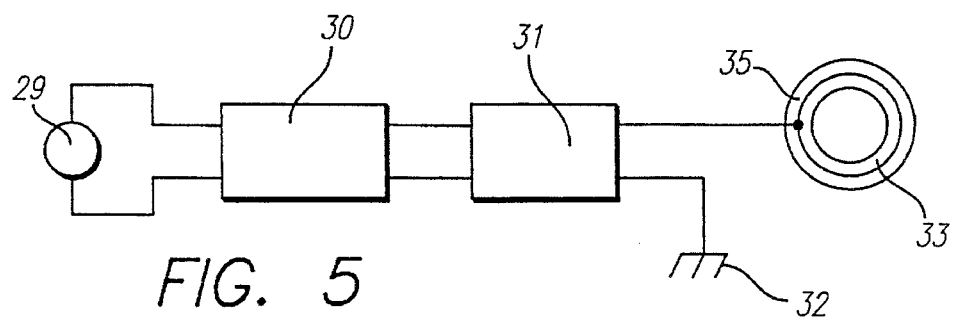
FIG. 5. This figure shows a diagram of the electronic circuit for the electric generator in its use as a high-frequency generator for ozonating water.

In practice, as shown in FIG. 1, the electronic circuit described and depicted in FIG. 5 is very simple and small, that is, it occupies very little space, so it may be held on the inside of the apparatus's own housing, in a recess (36) set for that purpose right in the conditioner's own body (1).

No further description is considered necessary in order for any expert on the subject to grasp the scope of the invention and the advantages it offers.

The materials, shape, size and position of the components may vary, provided that such variations do not alter the essential nature of the invention.

The terms used to write up this report should always be taken in their broadest sense, not as limitations.

What is claimed is:

1. A magnetic conditioner for treating liquids, comprising:

a tubular body made of a nonmagnetic material, said body including a longitudinal axis, a central flow passage extending along said axis, and including an inlet end and an outlet end spaced along said axis and communicating with said central flow passage, said inlet and outlet ends each respectively terminating in a companion flange; and a core located within said tubular body for establishing three independent magnetic fields aligned coaxially along said longitudinal axis, said core comprising first, second, and third magnets or groups of magnets, each of said magnets or groups of magnets being aligned coaxially along said longitudinal axis, each of magnets or groups of magnets having magnetic poles spaced apart along said longitudinal axis, each of said magnets being separated apart from one another by spacers, said core including first, second, and third magnetically permeable bodies spaced apart from and coaxially surrounding said first, second, and third magnets or groups of magnets, respectively, wherein said first magnet or group of magnets includes a south pole facing said inlet end and a north pole facing a north pole of said second magnet or group of magnets, wherein the second magnet or group of magnets includes a south pole facing a south pole of said third magnet or group of magnets, and wherein said third magnet or group of magnets includes a north pole facing said outlet end, and wherein said core further includes an auxiliary magnet or group of magnets coaxially aligned with said longitudinal axis and located between said first magnet or group of magnets and said inlet end, said auxiliary magnet or group of magnets including a north pole facing said inlet end and a south pole adjacent the south pole of said first magnet or group of magnets, telescoping shaft means for permitting axial movement of said auxiliary magnet or group of magnets along said longitudinal axis relative to said first magnet or group of magnets, wherein a conical plug is attached to a front of said auxiliary magnet or group of magnets and facing said inlet end, wherein said housing includes a truncated cone-shaped seat located between said conical plug and said inlet for receiving said conical plug, whereby a magnetic force caused by the like-pole interaction between the auxiliary magnet or group of magnets and said first group of magnets biases the plug toward said truncated cone-shaped seat, and whereby a greater stream of water flowing though the conditioner causes a greater axial movement of the plug and said auxiliary magnet or group of magnets in a direction away from said seat and towards said first magnet or group of magnets resulting in a greater influence of the auxiliary magnet or group of magnets on the first magnet or group of magnets, and a greater radial magnetic field established between said first magnet or group of magnets and said first magnetically permeable body.

2. The apparatus claimed in claim 1, wherein the body further comprises a magnetic prefilter including a side duct disposed between said seat and said Outlet end and extends at an oblique angle relative to said longitudinal axis, said duct including a free end that is closed by means of a lid, wherein said lid is attached to a permanent magnet and a tubular strainer, wherein the strainer is made of stainless steel and includes a free end that is chamfered and extends into said central flow passage.

3. The apparatus claimed in claim 2, further comprising a rotor disposed at the core of the body adjacent said second magnet or group of magnets, said second magnetically permeable body comprising a first magnet portion having a north pole facing said longitudinal axis and a second magnet portion located opposite said first magnet portion having a south pole facing said longitudinal axis, wherein the rotor bears a number of inner blades, and a coil surrounded by said first and second magnet portions of said second magnetically permeable body and operatively connected to the rotor such that when the fluid circulates through the conditioner, the orientation of the blades causes the rotor and coil to turn, generating in the coil an electromotive force which may be tapped by means of outside contacts.

4. The apparatus as claimed in claim 3, further comprising an electric circuit including a voltage multiplier and a frequency converter, wherein said voltage multiplier is connected to said outside contacts and wherein the voltage multiplier is coupled to said frequency converter to obtain a voltage on the order of approximately 6,000 volts at a very high frequency for ozonating the liquid flowing through the conditioner; and, wherein said frequency converter includes a pair of electrical outlets, wherein one of the outlets is grounded to said body, and the other outlet is connected to a distributing ring mounted inside said central flow passage and insulated from the body by means of a teflon sleeve, wherein the electric circuit is fitted into a small recess in the body or housing.

5. The apparatus claimed in claim 1, further comprising a rotor disposed at the core of the body adjacent said second magnet or group of magnets, said second magnetically permeable body comprising a first magnet portion having a north pole facing said longitudinal axis and a second magnet portion located opposite said first magnet portion having a south pole facing said longitudinal axis, wherein the rotor bears a number of inner blades, and a coil surrounded by said first and second magnet portions of said second magnetically permeable body and operatively connected to the rotor such that when the fluid circulates through the conditioner, the orientation of the blades causes the rotor and coil to turn, generating in the coil an electromotive force which may be tapped by means of outside contacts.

6. The apparatus as claimed in claim 5 further comprising an electric circuit including a voltage multiplier and a frequency converter, wherein said voltage multiplier is connected to said outside contacts and wherein the voltage multiplier is coupled to said frequency converter to obtain a voltage on the order of approximately 6,000 volts at a very high frequency for ozonating the liquid flowing through the conditioner; and, wherein said frequency converter includes a pair of electrical outlets, wherein one of the outlets is grounded to said body, and the other outlet is connected to a distributing ring mounted inside said central flow passage and insulated from the body by means of a teflon sleeve, wherein the electric circuit is fitted into a small recess in the body or housing.

* * * * *